US012711966B2

(12) United States Patent
Liu et al.

(10) Patent No.: US 12,711,966 B2
(45) Date of Patent: Aug. 18, 2026

(54) METHOD AND DEVICE FOR DECODING SIGNALS

(71) Applicant: HUAWEI TECHNOLOGIES CO., LTD., Shenzhen (CN)

(72) Inventors: Zexin Liu, Shenzhen (CN); Fengyan Qi, Shenzhen (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 18/810,463

(22) Filed: Aug. 20, 2024

(65) Prior Publication Data

US 2025/0087219 A1 Mar. 13, 2025

Related U.S. Application Data

(63) Continuation of application No. 18/489,875, filed on Oct. 19, 2023, now Pat. No. 12,100,401, which is a (Continued)

(30) Foreign Application Priority Data

Dec. 6, 2012 (CN) ......................... 201210518020.9
Jul. 16, 2013 (CN) ......................... 201310297982.0

(51) Int. Cl.
*G10L 19/002* (2013.01)
*G10L 19/005* (2013.01)

(Continued)

(52) U.S. Cl.
CPC .......... *G10L 19/002* (2013.01); *G10L 19/005* (2013.01); *G10L 19/0204* (2013.01); *G10L 19/028* (2013.01)

(58) Field of Classification Search
CPC . G10L 19/002; G10L 19/005; G10L 19/0204; G10L 19/028
See application file for complete search history.

(56) References Cited

U.S. PATENT DOCUMENTS 4,964,166 A * 10/1990 Wilson .................... G10L 19/06 704/229
5,268,685 A 12/1993 Fujiwara (Continued)

FOREIGN PATENT DOCUMENTS

CN 1462429 A 12/2003
CN 101436407 A 5/2009

(Continued)

*Primary Examiner* — Eric Yen

(57) ABSTRACT

In a method to decode signals, a computing device decodes spectral coefficients of a current frame are grouped into a plurality of sub-bands. The computing device classifies a sub-band as a bit allocation unsaturated sub-band based on an average quantity of allocated bits per spectral coefficient of a sub-band of the plurality of sub-bands and a threshold. The computing device obtains a noise filling gain based on an envelope of the sub-band, and obtains a reconstructed spectral coefficient of the sub-band by performing noise filling based on the noise filling gain. The computing device then obtains a frequency domain audio signal based on spectral coefficients in the sub-band obtained by decoding and the reconstructed spectral coefficient.

3 Claims, 3 Drawing Sheets

Related U.S. Application Data continuation of application No. 18/179,399, filed on Mar. 7, 2023, now Pat. No. 11,823,687, which is a continuation of application No. 17/204,073, filed on Mar. 17, 2021, now Pat. No. 11,610,592, which is a continuation of application No. 16/731,689, filed on Dec. 31, 2019, now Pat. No. 10,971,162, which is a continuation of application No. 16/256,421, filed on Jan. 24, 2019, now Pat. No. 10,546,589, which is a continuation of application No. 15/787,563, filed on Oct. 18, 2017, now Pat. No. 10,236,002, which is a continuation of application No. 15/451,866, filed on Mar. 7, 2017, now Pat. No. 9,830,914, which is a continuation of application No. 14/730,524, filed on Jun. 4, 2015, now Pat. No. 9,626,972, which is a continuation of application No. PCT/CN2013/080082, filed on Jul. 25, 2013.

(51) Int. Cl.

| | |
|---|---|
| ***G10L 19/02*** | (2013.01) |
| ***G10L 19/028*** | (2013.01) |

(56) References Cited

U.S. PATENT DOCUMENTS

| | | | | |
|---|---|---|---|---|
| 5,530,655 | A | 6/1996 | Lokhoff et al. | |
| 5,583,967 | A | 12/1996 | Akagiri | |
| 5,632,005 | A | 5/1997 | Davis et al. | |
| 5,673,363 | A | 9/1997 | Jeon et al. | |
| 5,699,484 | A * | 12/1997 | Davis | H04B 1/665 704/229 |
| 5,710,863 | A * | 1/1998 | Chen | G10L 19/0212 704/229 |
| 5,761,636 | A | 6/1998 | Bolton et al. | |
| 5,842,160 | A | 11/1998 | Zinser | |
| 6,058,359 | A | 5/2000 | Hagen et al. | |
| 6,351,730 | B2 | 2/2002 | Chen | |
| 7,483,836 | B2 | 1/2009 | Taori et al. | |
| 7,562,021 | B2 * | 7/2009 | Mehrotra | G10L 19/038 704/219 |
| 9,626,972 | B2 | 4/2017 | Liu et al. | |
| 9,830,914 | B2 | 11/2017 | Liu et al. | |
| 10,236,002 | B2 | 3/2019 | Liu et al. | |
| 2001/0023399 | A1 | 9/2001 | Matsumoto et al. | |
| 2003/0061055 | A1 * | 3/2003 | Taori | G10L 19/0208 704/E19.022 |
| 2003/0233234 | A1 | 12/2003 | Truman et al. | |
| 2003/0233236 | A1 | 12/2003 | Davidson et al. | |
| 2004/0122622 | A1 | 6/2004 | Mericas | |
| 2004/0122662 | A1 * | 6/2004 | Crockett | G10L 21/04 704/E21.017 |
| 2006/0122825 | A1 | 6/2006 | Oh et al. | |
| 2006/0155531 | A1 * | 7/2006 | Miller | G10L 19/0017 704/E19.01 |
| 2007/0016412 | A1 | 1/2007 | Mehrotra et al. | |
| 2007/0016414 | A1 | 1/2007 | Mehrotra et al. | |
| 2007/0016427 | A1 | 1/2007 | Thumpudi et al. | |
| 2007/0162277 | A1 | 7/2007 | Kurniawati et al. | |
| 2007/0244699 | A1 | 10/2007 | Mogi et al. | |
| 2008/0219455 | A1 | 9/2008 | Oh et al. | |
| 2008/0235034 | A1 | 9/2008 | Lee et al. | |
| 2008/0262835 | A1 | 10/2008 | Oshikiri | |
| 2008/0312759 | A1 | 12/2008 | Koishida et al. | |
| 2009/0030678 | A1 | 1/2009 | Kovesi et al. | |
| 2009/0210222 | A1 | 8/2009 | Mehrotra et al. | |
| 2010/0027810 | A1 | 2/2010 | Marton | |
| 2010/0094638 | A1 | 4/2010 | Lee et al. | |
| 2010/0114585 | A1 | 5/2010 | Yoon et al. | |
| 2010/0202558 | A1 * | 8/2010 | Hargreaves | G10L 19/0204 704/229 |
| 2010/0241437 | A1 | 9/2010 | Taleb et al. | |
| 2010/0322429 | A1 | 12/2010 | Norvell et al. | |
| 2011/0015768 | A1 | 1/2011 | Lim et al. | |
| 2011/0035212 | A1 | 2/2011 | Briand et al. | |
| 2011/0103591 | A1 * | 5/2011 | Ojala | G10L 19/008 381/17 |
| 2011/0161088 | A1 | 6/2011 | Bayer et al. | |
| 2011/0170711 | A1 | 7/2011 | Rettelbach et al. | |
| 2011/0178795 | A1 | 7/2011 | Bayer et al. | |
| 2011/0264454 | A1 | 10/2011 | Ullberg et al. | |
| 2011/0301961 | A1 | 12/2011 | Lee et al. | |
| 2012/0022878 | A1 * | 1/2012 | Chen | G10L 21/0364 704/500 |
| 2012/0029926 | A1 | 2/2012 | Krishnan et al. | |
| 2012/0146831 | A1 * | 6/2012 | Eksler | H03M 7/3082 341/200 |
| 2012/0185256 | A1 | 7/2012 | Virette et al. | |
| 2012/0226505 | A1 * | 9/2012 | Lin | H03M 7/3082 704/500 |
| 2012/0232908 | A1 | 9/2012 | Terriberry et al. | |
| 2012/0257644 | A1 * | 10/2012 | Sakamoto | G02B 6/02 385/124 |
| 2012/0259644 | A1 | 10/2012 | Lin et al. | |
| 2012/0288117 | A1 * | 11/2012 | Kim | G10L 19/032 381/94.2 |
| 2012/0323582 | A1 | 12/2012 | Peng et al. | |
| 2013/0006645 | A1 | 1/2013 | Jiang et al. | |
| 2013/0018660 | A1 | 1/2013 | Qi et al. | |
| 2013/0101028 | A1 | 4/2013 | Fukui et al. | |
| 2013/0173275 | A1 | 7/2013 | Liu et al. | |
| 2013/0218577 | A1 | 8/2013 | Taleb et al. | |
| 2014/0188464 | A1 | 7/2014 | Choo | |
| 2014/0219459 | A1 | 8/2014 | Daniel et al. | |
| 2014/0244274 | A1 | 8/2014 | Yamanashi et al. | |
| 2015/0046171 | A1 | 2/2015 | Grancharov et al. | |
| 2015/0066488 | A1 | 3/2015 | Bayer et al. | |
| 2015/0112693 | A1 | 4/2015 | Rettelbach et al. | |
| 2015/0269947 | A1 | 9/2015 | Liu et al. | |
| 2015/0302860 | A1 | 10/2015 | Qi et al. | |
| 2016/0173884 | A1 | 6/2016 | Le Leannec et al. | |
| 2017/0004839 | A1 | 1/2017 | Rettelbach et al. | |
| 2017/0316785 | A1 * | 11/2017 | Kim | G10L 19/028 |

FOREIGN PATENT DOCUMENTS

| | | | |
|---|---|---|---|
| CN | 101641734 | A | 2/2010 |
| CN | 101933086 | A | 12/2010 |
| CN | 102063905 | A | 5/2011 |
| CN | 102081926 | A | 6/2011 |
| CN | 102081927 | A | 6/2011 |
| CN | 102089806 | A | 6/2011 |
| CN | 102194457 | A | 9/2011 |
| CN | 102194458 | A | 9/2011 |
| CN | 102208188 | A | 10/2011 |
| EP | 1028539 | A2 | 8/2000 |
| EP | 2186089 | A1 | 5/2010 |
| EP | 2304720 | B1 | 11/2011 |
| JP | 2004522198 | A | 7/2004 |
| JP | 2007240902 | A | 9/2007 |
| JP | 2007264154 | A | 10/2007 |
| JP | 2010156990 | A | 7/2010 |
| JP | 2010538317 | A | 12/2010 |
| JP | 2011527455 | A | 10/2011 |
| KR | 20030014752 | A | 2/2003 |
| KR | 20110039245 | A | 4/2011 |
| WO | 02091363 | A1 | 11/2002 |
| WO | 2009029036 | A1 | 3/2009 |
| WO | 2009068084 | A1 | 6/2009 |
| WO | 2011059255 | A2 | 5/2011 |
| WO | 2012149843 | A1 | 11/2012 |

* cited by examiner

METHOD AND DEVICE FOR DECODING SIGNALS

CROSS-REFERENCE TO RELATED APPLICATIONS

This application is a continuation of U.S. patent application Ser. No. 18/489,875, filed on Oct. 19, 2023, which is a continuation of U.S. patent application Ser. No. 18/179,399, filed on Mar. 7, 2023, now U.S. Pat. No. 11,823,687, which is a continuation of U.S. patent application Ser. No. 17/204,073, filed on Mar. 17, 2021, now U.S. Pat. No. 11,610,592, which is a continuation of U.S. patent application Ser. No. 16/731,689, filed on Dec. 31, 2019, now U.S. Pat. No. 10,971,162, which is a continuation of U.S. patent application Ser. No. 16/256,421, filed on Jan. 24, 2019, now U.S. Pat. No. 10,546,589, which is a continuation of U.S. patent application Ser. No. 15/787,563, filed on Oct. 18, 2017, now U.S. Pat. No. 10,236,002, which is a continuation of U.S. patent application Ser. No. 15/451,866, filed on Mar. 7, 2017, now U.S. Pat. No. 9,830,914, which is a continuation of U.S. patent application Ser. No. 14/730,524, filed on Jun. 4, 2015, now U.S. Pat. No. 9,626,972, which is a continuation of International Patent Application No. PCT/CN2013/080082, filed on Jul. 25, 2013, which claims priority to Chinese Patent Application No. 201210518020.9, filed on Dec. 6, 2012, and Chinese Patent Application No. 201310297982.0, filed on Jul. 16, 2013. All of the aforementioned priority patent applications are hereby incorporated by reference in their entirety.

TECHNICAL FIELD

Embodiments of the present disclosure relate to the field of electronics, and in particular, to a method and device for decoding a signal.

BACKGROUND

In an existing frequency domain codec algorithm, a quantity of bits that can be allocated is insufficient when a bit rate is low. In this case, bits are allocated only to relatively important spectral coefficients, and the allocated bits are used to encode the relatively important spectral coefficients during encoding. However, no bit is allocated for a spectral coefficient (that is, a less important spectral coefficient) except the relatively important spectral coefficients, and the less important spectral coefficient is not encoded. For the spectral coefficients for which bits are allocated, because a quantity of bits that can be allocated is insufficient, there are a part of spectral coefficients with insufficient allocated bits. During encoding, there are no sufficient bits to encode the spectral coefficients with insufficient allocated bits, for example, only a small number of spectral coefficients in a sub-band are encoded.

Corresponding to an encoder, only the relatively important spectral coefficients are decoded at a decoder, and a less important spectral coefficient that has not been obtained by means of decoding is filled with a value of 0. If no processing is performed on a spectral coefficient that has not been obtained by means of decoding, a decoding effect is severely affected. For example, for decoding of an audio signal, an audio signal that is finally output sounds "an empty feeling" or "a sound of water" or the like, which severely affects auditory quality. Therefore, the spectral coefficient that has not been obtained by means of decoding needs to be restored using a noise filling method in order to output a signal of better quality. In an example (that is, a noise filling example) of restoring the spectral coefficient that has not been obtained by means of decoding, a spectral coefficient obtained by means of decoding may be saved in an array, and a spectral coefficient in the array is replicated to a location of a spectral coefficient in a sub-band for which no bit is allocated. The spectral coefficient that has not been obtained by means of decoding is restored by replacing the spectral coefficient that has not been obtained by means of decoding with a saved spectral coefficient that has been obtained by means of decoding.

In the foregoing solution to restoring a spectral coefficient that has not been obtained by means of decoding, only a spectral coefficient that has not been obtained by means of decoding and is in a sub-band for which no bit is allocated is restored, and quality of a decoded signal is not good enough.

SUMMARY

Embodiments of the present disclosure provide a method and device for decoding a signal, which can improve signal decoding quality.

According to a first aspect, a method for decoding a signal is provided, where the method includes obtaining spectral coefficients of sub-bands from a received bitstream by means of decoding, classifying sub-bands in which the spectral coefficients are located into a sub-band with saturated bit allocation and a sub-band with unsaturated bit allocation, performing noise filling on a spectral coefficient that has not been obtained by means of decoding and is in the sub-band with unsaturated bit allocation in order to restore the spectral coefficient that has not been obtained by means of decoding, and obtaining a frequency domain signal according to the spectral coefficients obtained by means of decoding and the restored spectral coefficient.

With reference to the first aspect, in a first implementation manner of the first aspect, classifying sub-bands in which the spectral coefficients are located into a sub-band with saturated bit allocation and a sub-band with unsaturated bit allocation may include comparing an average quantity of allocated bits per spectral coefficient with a first threshold, where an average quantity of allocated bits per spectral coefficient of one sub-band is a ratio of a quantity of bits allocated for the one sub-band to a quantity of spectral coefficients in the one sub-band, and using a sub-band whose average quantity of allocated bits per spectral coefficient is greater than or equal to the first threshold as a sub-band with saturated bit allocation, and using a sub-band whose average quantity of allocated bits per spectral coefficient is less than the first threshold as a sub-band with unsaturated bit allocation.

With reference to the first aspect or the first implementation manner of the first aspect, in a second implementation manner of the first aspect, performing noise filling on a spectral coefficient that has not been obtained by means of decoding and is in the sub-band with unsaturated bit allocation may include comparing the average quantity of allocated bits per spectral coefficient with a second threshold, where an average quantity of allocated bits per spectral coefficient of one sub-band is a ratio of a quantity of bits allocated for the one sub-band to a quantity of spectral coefficients in the one sub-band, calculating a harmonic parameter of a sub-band whose average quantity of allocated bits per spectral coefficient is greater than or equal to the second threshold, where the harmonic parameter represents harmonic strength or weakness of a frequency domain signal, and performing, based on the harmonic parameter, noise filling on the spectral coefficient that has not been obtained by means of decoding and is in the sub-band with unsaturated bit allocation.

With reference to the second implementation manner of the first aspect, in a third implementation manner of the first aspect, calculating a harmonic parameter of a sub-band whose average quantity of allocated bits per spectral coefficient is greater than or equal to the second threshold may include calculating at least one parameter of, a peak-to-average ratio, a peak envelope ratio, sparsity of a spectral coefficient obtained by means of decoding, a bit allocation variance of an entire frame, an average envelope ratio, an average-to-peak ratio, an envelope peak ratio, and an envelope average ratio that are of the sub-band whose average quantity of allocated bits per spectral coefficient is greater than or equal to the second threshold, and using one of the calculated at least one parameter or using, in a combining manner, the calculated parameter as the harmonic parameter.

With reference to the second or the third implementation manner of the first aspect, in a fourth implementation manner of the first aspect, performing, based on the harmonic parameter, noise filling on the spectral coefficient that has not been obtained by means of decoding and is in the sub-band with unsaturated bit allocation may include calculating, according to an envelope of the sub-band with unsaturated bit allocation and a spectral coefficient obtained by means of decoding, a noise filling gain of the sub-band with unsaturated bit allocation, calculating the peak-to-average ratio of the sub-band whose average quantity of allocated bits per spectral coefficient is greater than or equal to the second threshold and obtaining a global noise factor based on the peak-to-average ratio, correcting the noise filling gain based on the harmonic parameter and the global noise factor so as to obtain a target gain, and using the target gain and a weighted value of noise to restore the spectral coefficient that has not been obtained by means of decoding and is in the sub-band with unsaturated bit allocation.

With reference to the fourth implementation manner of the first aspect, in a fifth implementation manner of the first aspect, performing, based on the harmonic parameter, noise filling on the spectral coefficient that has not been obtained by means of decoding and is in the sub-band with unsaturated bit allocation may further include calculating a peak-to-average ratio of the sub-band with unsaturated bit allocation and comparing the peak-to-average ratio with a third threshold, and for a sub-band, whose peak-to-average ratio is greater than the third threshold, with unsaturated bit allocation, after a target gain is obtained, using a ratio of an envelope of the sub-band with unsaturated bit allocation to a maximum amplitude of a spectral coefficient, obtained by means of decoding, in the sub-band with unsaturated bit allocation to correct the target gain.

With reference to the fourth implementation manner of the first aspect, in a sixth implementation manner of the first aspect, correcting the noise filling gain based on the harmonic parameter and the global noise factor so as to obtain a target gain may include comparing the harmonic parameter with a fourth threshold, obtaining the target gain using $gain_T$=fac*gain*norm/peak when the harmonic parameter is greater than or equal to the fourth threshold, and obtaining the target gain using $gain_T$=fac'*gain and fac'=fac+step when the harmonic parameter is less than the fourth threshold, where $gain_T$ is the target gain, fac is the global noise factor, norm is the envelope of the sub-band with unsaturated bit allocation, peak is a maximum amplitude of the spectral coefficient, obtained by means of decoding, in the sub-band with unsaturated bit allocation, and step is a step by which the global noise factor changes according to a frequency.

With reference to the fourth implementation manner or the sixth implementation manner of the first aspect, in a seventh implementation manner of the first aspect, performing, based on the harmonic parameter, noise filling on the spectral coefficient that has not been obtained by means of decoding and is in the sub-band with unsaturated bit allocation may further include performing interframe smoothing processing on the restored spectral coefficient after the spectral coefficient that has not been obtained by means of decoding is restored.

With reference to the first aspect or the first implementation manner of the first aspect, in an eighth implementation manner of the first aspect, performing noise filling on a spectral coefficient that has not been obtained by means of decoding and is in the sub-band with unsaturated bit allocation includes comparing the average quantity of allocated bits per spectral coefficient with 0, where an average quantity of allocated bits per spectral coefficient of one sub-band is a ratio of a quantity of bits allocated for the one sub-band to a quantity of spectral coefficients in the one sub-band, calculating a harmonic parameter of a sub-band whose average quantity of allocated bits per spectral coefficient is not equal to 0, where the harmonic parameter represents harmonic strength or weakness of a frequency domain signal, and performing, based on the harmonic parameter, noise filling on the spectral coefficient that has not been obtained by means of decoding and is in the sub-band with unsaturated bit allocation.

With reference to the eighth implementation manner of the first aspect, in a ninth implementation manner of the first aspect, calculating a harmonic parameter of a sub-band whose average quantity of allocated bits per spectral coefficient is not equal to 0 includes calculating at least one parameter of, a peak-to-average ratio, a peak envelope ratio, sparsity of a spectral coefficient obtained by means of decoding, a bit allocation variance of an entire frame, an average envelope ratio, an average-to-peak ratio, an envelope peak ratio, and an envelope average ratio that are of the sub-band whose average quantity of allocated bits per spectral coefficient is not equal to 0, and using one of the calculated at least one parameter or using, in a combining manner, the calculated parameter as the harmonic parameter.

With reference to the ninth implementation manner of the first aspect, in a tenth implementation manner of the first aspect, performing, based on the harmonic parameter, noise filling on the spectral coefficient that has not been obtained by means of decoding and is in the sub-band with unsaturated bit allocation includes calculating, according to an envelope of the sub-band with unsaturated bit allocation and a spectral coefficient obtained by means of decoding, a noise filling gain of the sub-band with unsaturated bit allocation, calculating the peak-to-average ratio of the sub-band whose average quantity of allocated bits per spectral coefficient is not equal to 0 and obtaining a global noise factor based on the peak-to-average ratio, correcting the noise filling gain based on the harmonic parameter and the global noise factor so as to obtain a target gain, and using the target gain and a weighted value of noise to restore the spectral coefficient that has not been obtained by means of decoding and is in the sub-band with unsaturated bit allocation.

With reference to the tenth implementation manner of the first aspect, in an eleventh implementation manner of the first aspect, performing, based on the harmonic parameter, noise filling on the spectral coefficient that has not been obtained by means of decoding and is in the sub-band with unsaturated bit allocation further includes calculating a peak-to-average ratio of the sub-band with unsaturated bit allocation and comparing the peak-to-average ratio with a third threshold, and for a sub-band, whose peak-to-average ratio is greater than the third threshold, with unsaturated bit allocation, after a target gain is obtained, using a ratio of an envelope of the sub-band with unsaturated bit allocation to a maximum amplitude of a spectral coefficient, obtained by means of decoding, in the sub-band with unsaturated bit allocation to correct the target gain.

With reference to the tenth implementation manner of the first aspect, in a twelfth implementation manner of the first aspect, correcting the noise filling gain based on the harmonic parameter and the global noise factor so as to obtain a target gain includes comparing the harmonic parameter with a fourth threshold, obtaining the target gain using $gain_T$=fac*gain*norm/peak when the harmonic parameter is greater than or equal to the fourth threshold, and obtaining the target gain using $gain_T$=fac'*gain and fac'=fac+step when the harmonic parameter is less than the fourth threshold, where $gain_T$ is the target gain, fac is the global noise factor, norm is the envelope of the sub-band with unsaturated bit allocation, peak is a maximum amplitude of the spectral coefficient, obtained by means of decoding, in the sub-band with unsaturated bit allocation, and step is a step by which the global noise factor changes according to a frequency.

With reference to the tenth implementation manner or the twelfth implementation manner of the first aspect, in a thirteenth implementation manner of the first aspect, performing, based on the harmonic parameter, noise filling on the spectral coefficient that has not been obtained by means of decoding and is in the sub-band with unsaturated bit allocation further includes after the spectral coefficient that has not been obtained by means of decoding is restored, performing interframe smoothing processing on the restored spectral coefficient.

According to a second aspect, a device for decoding a signal is provided, where the device includes a decoding unit configured to obtain spectral coefficients of sub-bands from a received bitstream by means of decoding, a classifying unit configured to classify sub-bands in which the spectral coefficients are located into a sub-band with saturated bit allocation and a sub-band with unsaturated bit allocation, where the sub-band with saturated bit allocation refers to a sub-band in which allocated bits can be used to encode all spectral coefficients in the sub-band, and the sub-band with unsaturated bit allocation refers to a sub-band in which allocated bits can be used to encode only a part of spectral coefficients in the sub-band, and a sub-band for which no bit is allocated, a restoring unit configured to perform noise filling on a spectral coefficient that has not been obtained by means of decoding and is in the sub-band with unsaturated bit allocation in order to restore the spectral coefficient that has not been obtained by means of decoding, and an output unit configured to obtain a frequency domain signal according to the spectral coefficients obtained by means of decoding and the restored spectral coefficient.

With reference to the second aspect, in a first implementation manner of the second aspect, the classifying unit may include a comparing component configured to compare an average quantity of allocated bits per spectral coefficient with a first threshold, where the average quantity of allocated bits per spectral coefficient is a ratio of a quantity of bits allocated for each sub-band to a quantity of spectral coefficients in each sub-band, and a classifying component configured to classify a sub-band whose average quantity of allocated bits per spectral coefficient is greater than or equal to the first threshold as a sub-band with saturated bit allocation, and classify a sub-band whose average quantity of allocated bits per spectral coefficient is less than the first threshold as a sub-band with unsaturated bit allocation.

With reference to the second aspect or the first implementation manner of the second aspect, in a second implementation manner of the second aspect, the restoring unit may include a calculating component configured to compare the average quantity of allocated bits per spectral coefficient with a second threshold, and calculate a harmonic parameter of a sub-band whose average quantity of allocated bits per spectral coefficient is greater than or equal to the second threshold, where an average quantity of allocated bits per spectral coefficient of one sub-band is a ratio of a quantity of bits allocated for the one sub-band to a quantity of spectral coefficients in the one sub-band, and the harmonic parameter represents harmonic strength or weakness of a frequency domain signal, and a filling component configured to perform, based on the harmonic parameter, noise filling on the spectral coefficient that has not been obtained by means of decoding and is in the sub-band with unsaturated bit allocation in order to restore the spectral coefficient that has not been obtained by means of decoding.

With reference to the second implementation manner of the second aspect, in a third implementation manner of the second aspect, calculating component may calculate the harmonic parameter using the following operations of calculating at least one parameter of a peak-to-average ratio, a peak envelope ratio, sparsity of a spectral coefficient obtained by means of decoding, and a bit allocation variance of an entire frame that are of the sub-band whose average quantity of allocated bits per spectral coefficient is greater than or equal to the second threshold, and using one of the calculated at least one parameter or using, in a combining manner, the calculated parameter as the harmonic parameter.

With reference to the second implementation manner or the third implementation manner of the second aspect, in a fourth implementation manner of the second aspect, the filling component may include a gain calculating module configured to calculate, according to an envelope of the sub-band with unsaturated bit allocation and a spectral coefficient obtained by means of decoding, a noise filling gain of the sub-band with unsaturated bit allocation, calculate the peak-to-average ratio of the sub-band whose average quantity of allocated bits per spectral coefficient is greater than or equal to the second threshold and obtain a global noise factor based on a peak-to-average ratio of the sub-band with saturated bit allocation, and correct the noise filling gain based on the harmonic parameter and the global noise factor so as to obtain a target gain, and a filling module configured to use the target gain and a weighted value of noise to restore the spectral coefficient that has not been obtained by means of decoding and is in the sub-band with unsaturated bit allocation.

With reference to the fourth implementation manner of the second aspect, in a fifth implementation manner of the second aspect, the filling component further includes a correction module configured to calculate a peak-to-average ratio of the sub-band with unsaturated bit allocation and compare the peak-to-average ratio with a third threshold, and for a sub-band, whose peak-to-average ratio is greater than the third threshold, with unsaturated bit allocation, after a target gain is obtained, use a ratio of an envelope of the sub-band with unsaturated bit allocation to a maximum amplitude of a spectral coefficient, obtained by means of decoding, in the sub-band with unsaturated bit allocation to correct the target gain in order to obtain a corrected target gain, where the filling module uses the corrected target gain and the weighted value of noise to restore the spectral coefficient that has not been obtained by means of decoding and is in the sub-band with unsaturated bit allocation.

With reference to the fourth implementation manner or the fifth implementation manner of the second aspect, in a sixth implementation manner of the second aspect, the gain calculating module may correct, using the following operations, the noise filling gain based on the harmonic parameter and the global noise factor, comparing the harmonic parameter with a fourth threshold, obtaining the target gain using $gain_T$=fac*gain*norm/peak when the harmonic parameter is greater than or equal to the fourth threshold, and obtaining the target gain using $gain_T$=fac'*gain and fac'=fac+step when the harmonic parameter is less than the fourth threshold, where $gain_T$ is the target gain, fac is the global noise factor, norm is the envelope of the sub-band with unsaturated bit allocation, peak is a maximum amplitude of the spectral coefficient, obtained by means of decoding, in the sub-band with unsaturated bit allocation, and step is a step by which the global noise factor changes according to a frequency.

With reference to the fourth implementation manner or the fifth implementation manner or the sixth implementation manner of the second aspect, in a seventh implementation manner of the second aspect, the filling component further includes an interframe smoothing module configured to perform interframe smoothing processing on the restored spectral coefficient to obtain a spectral coefficient on which smoothing processing has been performed after the spectral coefficient that has not been obtained by means of decoding is restored, where the output unit is configured to obtain the frequency domain signal according to the spectral coefficients obtained by means of decoding and the spectral coefficient on which smoothing processing has been performed.

With reference to the second aspect or the first implementation manner of the second aspect, in an eighth implementation manner of the second aspect, the restoring unit includes a calculating component configured to compare the average quantity of allocated bits per spectral coefficient with 0, and calculate a harmonic parameter of a sub-band whose average quantity of allocated bits per spectral coefficient is not equal to 0, where an average quantity of allocated bits per spectral coefficient of one sub-band is a ratio of a quantity of bits allocated for the one sub-band to a quantity of spectral coefficients in the one sub-band, and the harmonic parameter represents harmonic strength or weakness of a frequency domain signal, and a filling component configured to perform, based on the harmonic parameter, noise filling on the spectral coefficient that has not been obtained by means of decoding and is in the sub-band with unsaturated bit allocation in order to restore the spectral coefficient that has not been obtained by means of decoding.

With reference to the eighth implementation manner of the second aspect, in a ninth implementation manner of the second aspect, the calculating component calculates the harmonic parameter using the following operations calculating at least one parameter of a peak-to-average ratio, a peak envelope ratio, sparsity of a spectral coefficient obtained by means of decoding, a bit allocation variance of an entire frame, an average envelope ratio, an average-to-peak ratio, an envelope peak ratio, and an envelope average ratio that are of the sub-band whose average quantity of allocated bits per spectral coefficient is not equal to 0, and using one of the calculated at least one parameter or using, in a combining manner, the calculated parameter as the harmonic parameter.

With reference to the ninth implementation manner of the second aspect, in a tenth implementation manner of the second aspect, the filling component includes a gain calculating module configured to calculate, according to an envelope of the sub-band with unsaturated bit allocation and a spectral coefficient obtained by means of decoding, a noise filling gain of the sub-band with unsaturated bit allocation, calculate the peak-to-average ratio of the sub-band whose average quantity of allocated bits per spectral coefficient is not equal to 0 and obtain a global noise factor based on the peak-to-average ratio, and correct the noise filling gain based on the harmonic parameter and the global noise factor so as to obtain a target gain, and a filling module configured to use the target gain and a weighted value of noise to restore the spectral coefficient that has not been obtained by means of decoding and is in the sub-band with unsaturated bit allocation.

With reference to the tenth implementation manner of the second aspect, in an eleventh implementation manner of the second aspect, the filling component further includes a correction module configured to calculate a peak-to-average ratio of the sub-band with unsaturated bit allocation and compare the peak-to-average ratio with a third threshold, and for a sub-band, whose peak-to-average ratio is greater than the third threshold, with unsaturated bit allocation, after a target gain is obtained, use a ratio of an envelope of the sub-band with unsaturated bit allocation to a maximum amplitude of a spectral coefficient, obtained by means of decoding, in the sub-band with unsaturated bit allocation to correct the target gain in order to obtain a corrected target gain, where the filling module uses the corrected target gain and the weighted value of noise to restore the spectral coefficient that has not been obtained by means of decoding and is in the sub-band with unsaturated bit allocation.

With reference to the tenth implementation manner of the second aspect, in a twelfth implementation manner of the second aspect, the gain calculating module corrects, using the following operations, the noise filling gain based on the harmonic parameter and the global noise factor comparing the harmonic parameter with a fourth threshold, obtaining the target gain using $gain_T$=fac*gain*norm/peak when the harmonic parameter is greater than or equal to the fourth threshold, and obtaining the target gain using $gain_T$=fac'*gain and fac'=fac+step when the harmonic parameter is less than the fourth threshold, where $gain_T$ is the target gain, fac is the global noise factor, norm is the envelope of the sub band with unsaturated bit allocation, peak is a maximum amplitude of the spectral coefficient, obtained by means of decoding, in the sub-band with unsaturated bit allocation, and step is a step by which the global noise factor changes according to a frequency.

With reference to the tenth implementation manner or the twelfth implementation manner of the second aspect, in a thirteenth implementation manner of the second aspect, the filling component further includes an interframe smoothing module configured to perform interframe smoothing processing on the restored spectral coefficient to obtain a spectral coefficient on which smoothing processing has been performed, after the spectral coefficient that has not been obtained by means of decoding is restored, where the output unit is configured to obtain the frequency domain signal according to the spectral coefficients obtained by means of decoding and the spectral coefficient on which smoothing processing has been performed.

According to the embodiments of the present disclosure, a sub-band with unsaturated bit allocation in spectral coefficients may be obtained by means of classification, and a spectral coefficient that has not been obtained by means of decoding and is in the sub-band with unsaturated bit allocation is restored instead of merely restoring a spectral coefficient that has not been obtained by means of decoding and is in a sub-band with no bit allocated, thereby improving signal decoding quality.

BRIEF DESCRIPTION OF DRAWINGS

To describe the technical solutions in some of the embodiments of the present disclosure more clearly, the following briefly introduces the accompanying drawings describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The present disclosure provides a frequency domain decoding method. An encoder groups spectral coefficients into sub-bands and allocates encoding bits for each sub-band. Spectral coefficients in the sub-band are quantized according to bits allocated for each sub-band in order to obtain an encoding bitstream. When a bit rate is low and a quantity of bits that can be allocated is insufficient, the encoder allocates bits only to a relatively important spectral coefficient. For the sub-bands, allocated bits have different cases allocated bits may be used to encode all spectral coefficients in a sub-band, allocated bits may be used to encode only a part of spectral coefficients in a sub-band, or no bit is allocated for a sub-band. When allocated bits may be used to encode all spectral coefficients in a sub-band, a decoder can directly obtain all the spectral coefficients in the sub-band by means of decoding. When no bit is allocated for the sub-band, the decoder cannot obtain a spectral coefficient of the sub-band by means of decoding and restores, using a noise filling method, a spectral coefficient that has not been obtained by means of decoding. When allocated bits can be used to encode only a part of spectral coefficients in a sub-band, the decoder may restore a part of spectral coefficients in the sub-band, and a spectral coefficient that has not been obtained by means of decoding (that is, a spectral coefficient not encoded by the encoder) is restored using noise filling.

The technical solutions for decoding a signal in the embodiments of the present disclosure may be applied to various communications systems, for example, a Global System for Mobile Communications (GSM), a Code Division Multiple Access (CDMA) system, Wideband Code Division Multiple Access (WCDMA), a general packet radio service (GPRS), and Long Term Evolution (LTE). Communications systems or devices to which the technical solutions for decoding a signal in the embodiments of the present disclosure are applied do not constitute a limitation on the present disclosure.

Figure 1:
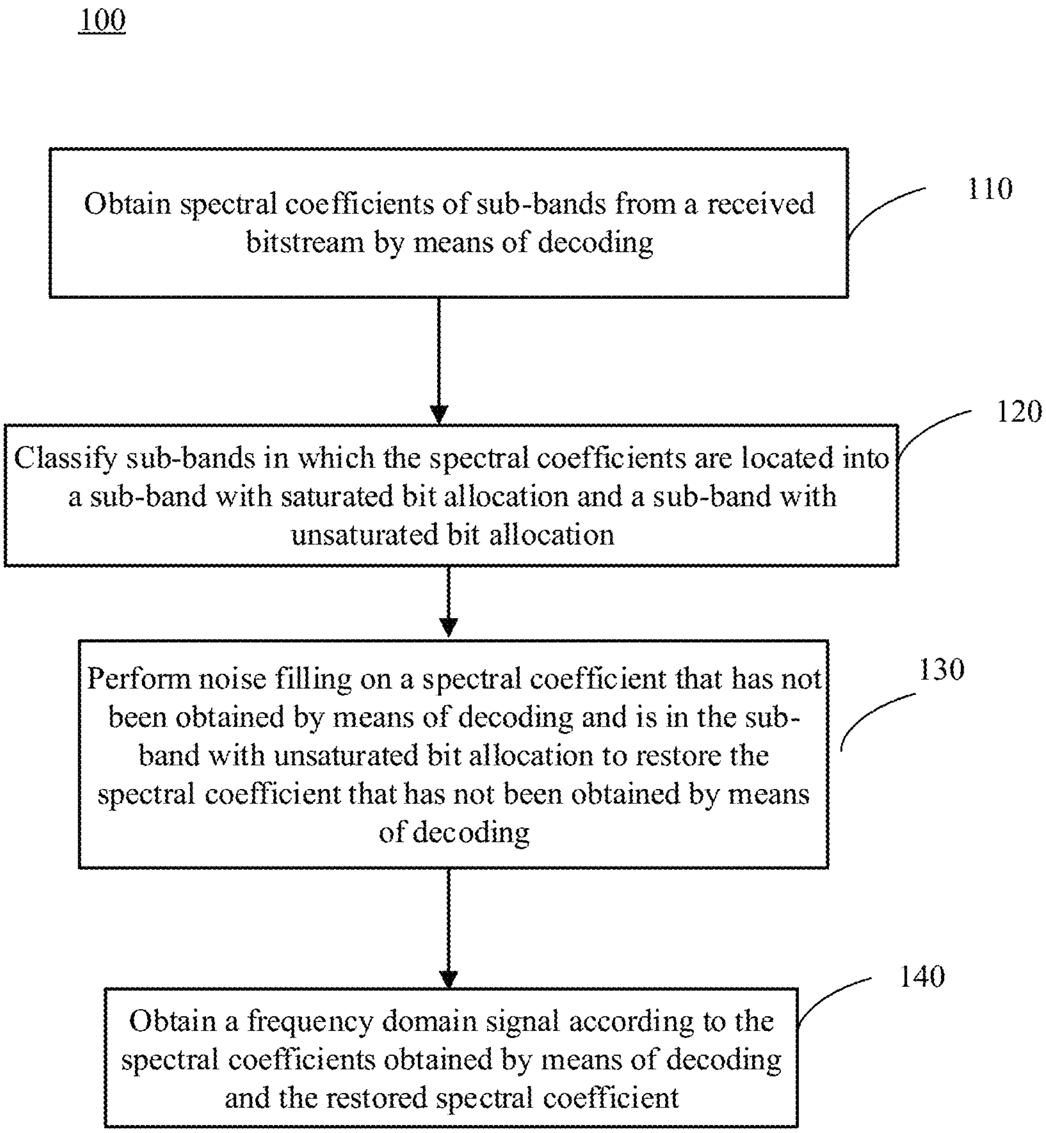
FIG. 1 is a flowchart of a method for decoding a signal according to an embodiment of the present disclosure.

FIG. 1 is a flowchart of a method 100 for decoding a signal according to an embodiment of the present disclosure.

The method 100 for decoding a signal includes the following steps.

Step 110: Obtain spectral coefficients of sub-bands from a received bitstream by means of decoding.

Step 120: Classify sub-bands in which the spectral coefficients are located into a sub-band with saturated bit allocation and a sub-band with unsaturated bit allocation, where the sub-band with saturated bit allocation refers to a sub-band in which allocated bits can be used to encode all spectral coefficients in the sub-band, and the sub-band with unsaturated bit allocation refers to a sub-band in which allocated bits can be used to encode only a part of spectral coefficients in the sub-band, and a sub-band for which no bit is allocated.

Step 130: Perform noise filling on a spectral coefficient that has not been obtained by means of decoding and is in the sub-band with unsaturated bit allocation to restore the spectral coefficient that has not been obtained by means of decoding.

Step 140: Obtain a frequency domain signal according to the spectral coefficients obtained by means of decoding and the restored spectral coefficient.

In step 110, obtaining spectral coefficients of sub-bands from a received bitstream by means of decoding may include obtaining the spectral coefficients from the received bitstream by means of decoding, and grouping the spectral coefficients into the sub-bands. The spectral coefficients may be spectral coefficients of the following classes of signals such as an image signal, a data signal, an audio signal, a video signal, and a text signal. The spectral coefficients may be acquired using various decoding methods. A specific signal class and decoding method does not constitute a limitation on the present disclosure.

An encoder groups the spectral coefficients into the sub-bands and allocates encoding bits for each sub-band. After using a sub-band classification method the same as that of the encoder to obtain the spectral coefficients by means of decoding, a decoder groups, according to frequencies of spectral coefficients, the spectral coefficients obtained by means of decoding into the sub-bands.

In an example, a frequency band in which the spectral coefficients are located may be evenly grouped into multiple sub-bands, and then the spectral coefficients are grouped, according to a frequency of each spectral coefficient, into the sub-bands in which the frequencies are located. In addition, the spectral coefficients may be grouped into sub-bands of a frequency domain according to various existing or future classification methods, and then various processing is performed.

In step 120, the sub-bands in which the spectral coefficients are located are classified into a sub-band with saturated bit allocation and a sub-band with unsaturated bit allocation, where the sub-band with saturated bit allocation refers to a sub-band in which allocated bits can be used to encode all spectral coefficients in the sub-band, and the sub-band with unsaturated bit allocation refers to a sub-band in which allocated bits can be used to encode only a part of spectral coefficients in the sub-band, and a sub-band for which no bit is allocated. When bit allocation of a spectral coefficient is saturated, even if more bits are allocated for the spectral coefficient, quality of a signal obtained by means of decoding is not remarkably improved.

In an example, it may be learned, according to an average quantity of allocated bits per spectral coefficient in a sub-band, whether bit allocation of the sub-band is saturated. Further, the average quantity of allocated bits per spectral coefficient is compared with a first threshold, where the average quantity of allocated bits per spectral coefficient is a ratio of a quantity of bits allocated for each sub-band to a quantity of spectral coefficients in each sub-band, that is, an average quantity of allocated bits per spectral coefficient of one sub-band is a ratio of a quantity of bits allocated for the one sub-band to a quantity of spectral coefficients in the one sub-band, a sub-band whose average quantity of allocated bits per spectral coefficient is greater than or equal to the first threshold is used as a sub-band with saturated bit allocation and a sub-band whose average quantity of allocated bits per spectral coefficient is less than the first threshold is used as a sub-band with unsaturated bit allocation. In an example, the average quantity of allocated bits per spectral coefficient in a sub-band may be obtained by dividing a quantity of bits allocated for the sub-band by a quantity of spectral coefficients in the sub-band. The first threshold may be preset, or may be easily obtained, for example, by an experiment. For an audio signal, the first threshold may be 1.5 bits/spectral coefficient.

In step 130, noise filling is performed on the spectral coefficient that has not been obtained by means of decoding and is in the sub-band with unsaturated bit allocation in order to restore the spectral coefficient that has not been obtained by means of decoding. The sub-band with unsaturated bit allocation includes a sub-band whose spectral coefficient has no allocated bit and a sub-band for which bits is allocated but the allocated bits are insufficient. Various noise filling methods may be used to restore the spectral coefficient that has not been obtained by means of decoding.

In other approaches, only a spectral coefficient that has not been obtained by means of decoding and is in a sub-band for which no bit is allocated is restored, and a spectral coefficient that has not been obtained by means of decoding and exists due to insufficient bit allocation in a sub-band for which bits are allocated is not restored. In addition, the spectral coefficients obtained by means of decoding are generally not much related to the spectral coefficient that has not been obtained by means of decoding, and it is difficult to obtain a good decoding effect directly by performing replication. In this embodiment of the present disclosure, a new noise filling method is put forward, that is, noise filling is performed based on a harmonic parameter harm of a sub-band whose quantity of bits is greater than or equal to a second threshold. Further, the average quantity of allocated bits per spectral coefficient is compared with the second threshold, where the average quantity of allocated bits per spectral coefficient is the ratio of the quantity of bits allocated for each sub-band to the quantity of spectral coefficients in each sub-band, that is, an average quantity of allocated bits per spectral coefficient of one sub-band is a ratio of a quantity of bits allocated for the one sub-band to a quantity of spectral coefficients in the one sub-band, a harmonic parameter of a sub-band whose average quantity of allocated bits per spectral coefficient is greater than or equal to the second threshold is calculated, where the harmonic parameter represents harmonic strength or weakness of a frequency domain signal, and noise filling is performed, based on the harmonic parameter, on the spectral coefficient that has not been obtained by means of decoding and is in the sub-band with unsaturated bit allocation. The second threshold may be preset, and the second threshold is less than or equal to the foregoing first threshold and may be another threshold such as 1.3 bits/spectral coefficient. The harmonic parameter harm is used to represent the harmonic strength or weakness of a frequency domain signal. In a case in which harmonicity of a frequency domain signal is strong, there are a relatively large quantity of spectral coefficients with a value of 0 in the spectral coefficients obtained by means of decoding, and noise filling does not need to be performed on these spectral coefficients with the value of 0. Therefore, if noise filling is differentially performed, based on the harmonic parameter, on the spectral coefficient (that is, a spectral coefficient with the value of 0) that has not been obtained by means of decoding, an error of noise filling performed on the spectral coefficients, obtained by means of decoding, with the value of 0 may be avoided, thereby improving signal decoding quality.

The harmonic parameter harm of the sub-band whose average quantity of allocated bits per spectral coefficient is greater than or equal to the second threshold may be represented by one or more of a peak-to-average ratio (that is, a ratio of a peak value to an average amplitude), a peak envelope ratio, sparsity of a spectral coefficient obtained by means of decoding, a bit allocation variance of an entire frame, an average envelope ratio, an average-to-peak ratio (that is, a ratio of an average amplitude to a peak value), an envelope peak ratio, and an envelope average ratio that are of the sub-band. A manner of calculating a harmonic parameter is briefly described herein in order to disclose the present disclosure with more details.

A peak-to-average ratio sharp of a sub-band may be calculated using the following formula (1):

$$\text{sharp} = \frac{\text{peak} * \text{size\_sfm}}{\text{mean}}, \quad \text{mean} = \sum_{size\_sfm} |coef[sfm]|, \qquad \text{formula (1)}$$

where peak is a maximum amplitude of a spectral coefficient that is obtained by means of decoding and in a sub-band whose index is sfm, size_sfm is a quantity of spectral coefficients in the sub-band sfm or a quantity of spectral coefficients that are obtained by means of decoding and in the sub-band sfm, and mean is a sum of amplitudes of all spectral coefficients. A peak envelope ratio PER of a sub-band may be calculated using the following formula (2):

$$PER = \frac{\text{peak}}{norm[sfm]}, \qquad \text{formula (2)}$$

where peak is the maximum amplitude of the spectral coefficient that is obtained by means of decoding and in the sub-band sfm, and norm[sfm] is an envelope of the spectral coefficient that is obtained by means of decoding and in the sub-band sfm. Sparsity spar of a sub-band is used to represent whether spectral coefficients in the sub-band are centrally distributed at several frequency bins or are sparsely distributed in the entire sub-band, and the sparsity may be calculated using the following formula (3):

$$spar = \frac{\text{num\_de\_coef}}{\text{pos\_max} - \text{pos\_min}}, \quad \text{formula (3)}$$

where num_de_coef is a quantity of spectral coefficients that are obtained by means of decoding and in a sub-band, pos_max is a highest frequency location of spectral coefficients that are obtained by means of decoding and in the sub-band, and pos_min is a lowest frequency location of the spectral coefficients that are obtained by means of decoding and in the sub-band. A bit allocation variance var of an entire frame may be calculated using the following formula (4):

$$\text{var} = \frac{\sum_{sfm=1}^{last\_sfm} |\text{bit}[sfm] - \text{bit}[sfm-1]|}{\text{total\_bit}}, \quad \text{formula (4)}$$

where last_sfm represents a highest frequency sub-band for which bits are allocated in the entire frame, bit[sfm] represents a quantity of bits allocated for the sub-band sfm, bit[sfm-1] represents a quantity of bits allocated for a sub-band sfm-1, and total_bit represents a total quantity of bits allocated for all sub-bands. Larger values of the peak-to-average ratio sharp, the peak envelope ratio PER, the sparsity spar, and the bit allocation variance var indicate stronger harmonicity of a frequency domain signal, on the contrary, smaller values of the peak-to-average ratio sharp, the peak envelope ratio PER, the sparsity spar, and the bit allocation variance (var) indicate weaker harmonicity of the frequency domain signal. In addition, the four harmonic parameters may be used in a combining manner to represent harmonic strength or weakness. In practice, an appropriate combining manner may be selected according to a requirement. Typically, weighted summation may be performed on two or more of the four parameters and an obtained sum is used as a harmonic parameter. Therefore, the harmonic parameter may be calculated using the following operations of calculating at least one parameter of the peak-to-average ratio, the peak envelope ratio, the sparsity of a spectral coefficient obtained by means of decoding, and the bit allocation variance of an entire frame that are of the sub-band whose average quantity of allocated bits per spectral coefficient is greater than or equal to the second threshold, and using one of the calculated at least one parameter or using, in a combining manner, the calculated parameter as the harmonic parameter. It should be noted that a parameter of another definition form may further be used in addition to the four parameters provided that the parameter of another definition form can represent harmonicity of a frequency domain signal.

As described above, after the harmonic parameter is obtained, noise filling is performed, based on the harmonic parameter, on the spectral coefficient that has not been obtained by means of decoding and is in the sub-band with unsaturated bit allocation, which is described below in detail with reference to FIG. 2.

In step 140, the frequency domain signal is obtained according to the spectral coefficients obtained by means of decoding and the restored spectral coefficient. After the spectral coefficients obtained by means of decoding are obtained by means of decoding and the spectral coefficient that has not been obtained by means of decoding is restored, a frequency domain signal in an entire frequency band is obtained, and an output signal of a time domain is obtained by performing processing such as frequency domain inverse transformation, for example, inverse fast Fourier transform (IFFT). In practice, an engineering person skilled in the art understands a solution to how an output signal of a time domain is obtained according to a spectral coefficient, and details are not described herein again.

In the foregoing method for decoding a signal in this embodiment of the present disclosure, a sub-band with unsaturated bit allocation in sub-bands of a frequency domain signal is obtained by means of classification, and a spectral coefficient that has not been obtained by means of decoding and is in the sub-band with unsaturated bit allocation is restored, thereby improving signal decoding quality. In addition, in a case in which a spectral coefficient that has not been obtained by means of decoding is restored based on a harmonic parameter, an error of noise filling performed on spectral coefficients, obtained by means of decoding, with a value of 0 may be avoided, thereby further improving signal decoding quality.

Figure 2:
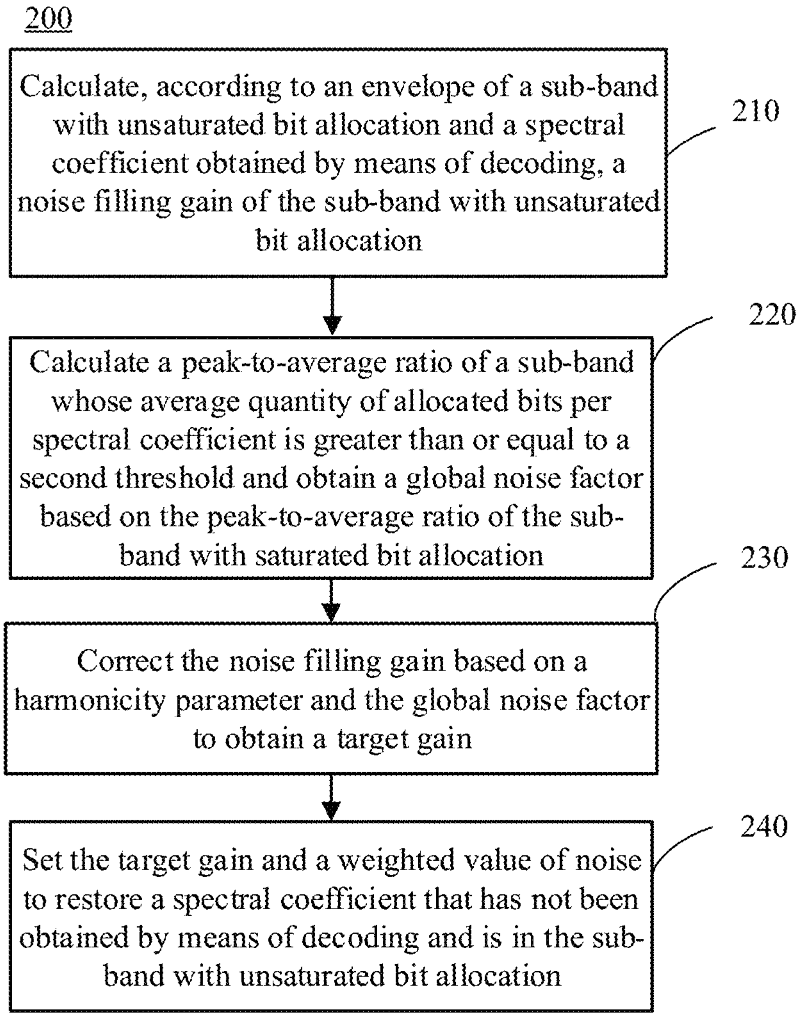
FIG. 2 is a flowchart of noise filling processing in a method for decoding a signal according to an embodiment of the present disclosure.

FIG. 2 is a flowchart of noise filling processing 200 in a method for decoding a signal according to an embodiment of the present disclosure.

The noise filling processing 200 includes the following steps.

Step 210: Calculate, according to an envelope of a sub-band with unsaturated bit allocation and a spectral coefficient obtained by means of decoding, a noise filling gain of the sub-band with unsaturated bit allocation.

Step 220: Calculate a peak-to-average ratio of a sub-band whose average quantity of allocated bits per spectral coefficient is greater than or equal to a second threshold and obtain a global noise factor based on a peak-to-average ratio of the sub-band with saturated bit allocation.

Step 230: Correct the noise filling gain based on a harmonic parameter and the global noise factor to obtain a target gain.

Step 240: Set the target gain and a weighted value of noise to restore a spectral coefficient that has not been obtained by means of decoding and is in the sub-band with unsaturated bit allocation.

In step 210, for the sub-band sfm with unsaturated bit allocation, a noise filling gain of the sub-band sfm with unsaturated bit allocation may be calculated according to the following formula (5) or (6):

$$\text{gain} = \sqrt{norm[sfm] * norm[sfm] * \text{size\_sfm} - \sum_i coef[i] * coef[i]} \, / \text{size\_sfm} \quad \text{formula (5)}$$

$$\text{gain} = \left( norm[sfm] * \text{size\_sfm} - \sum_i |coef[i]| \right) / \text{size\_sfm}, \quad \text{formula (6)}$$

where norm[sfm] is the envelope of the spectral coefficient that has been obtained by means of decoding and is in the sub-band (an index is sfm) with unsaturated bit allocation, coef[i] is the $i^{th}$ spectral coefficient that has been obtained by means of decoding and is in a sub-band with unsaturated bit allocation, and size_sfm is a quantity of spectral coefficients in the sub-band sfm with unsaturated bit allocation or a quantity of spectral coefficients that has been obtained by means of decoding and is in the sub-band sfm.

In step 220, the global noise factor may be calculated based on the peak-to-average ratio sharp of the sub-band with saturated bit allocation (referring to the foregoing description with reference to formula (1). Further, an average value of the peak-to-average ratio sharp may be calculated, and a multiple of a reciprocal of the average value is used as the global noise factor fac.

In step 230, the noise filling gain is corrected based on the harmonic parameter and the global noise factor to obtain the target gain $gain_T$. In an example, the target gain $gain_T$ may be obtained according to the following formula (7):

$$gain_T = fac \times harm \times gain \quad \text{formula(7)},$$

where fac is the global noise factor, harm is the harmonic parameter, and gain is the noise filling gain. In another example, it may also be that harmonic strength or weakness is determined first, and then the target gain $gain_T$ is obtained in a different manner according to the harmonic strength or weakness. For example, the harmonic parameter is compared with a fourth threshold.

When the harmonic parameter is greater than or equal to the fourth threshold, the target gain $gain_T$ is obtained using the following formula (8):

$$gain_T = fac * gain * norm[sfm]/peak \quad \text{formula (8)}$$

When the harmonic parameter is less than the fourth threshold, the target gain $gain_T$ is obtained using the following formula (9):

$$gain_T = fac' * gain,\ fac' = fac + step \quad \text{formula (9)},$$

where fac is the global noise factor, norm[sfm] is the envelope of the sub-band sfm with unsaturated bit allocation, peak is a maximum amplitude of the spectral coefficient, obtained by means of decoding, in the sub-band with unsaturated bit allocation, and step is a step by which the global noise factor changes according to a frequency. The global noise factor increases from a low frequency to a high frequency according to the step, and the step may be determined according to a highest frequency sub-band for which bits are allocated, or the global noise factor. The fourth threshold may be preset, or may be set to a different value in practice according to a different signal feature.

In step 240, the target gain and the weighted value of noise are used to restore the spectral coefficient that has not been obtained by means of decoding and is in the sub-band with unsaturated bit allocation. In an example, the target gain and the weighted value of noise may be used to obtain filling noise, and the filling noise is used to perform noise filling on the spectral coefficient that has not been obtained by means of decoding and is in the sub-band with unsaturated bit allocation to restore a frequency domain signal that has not been obtained by means of decoding. The noise may be noise, such as random noise, of any type. It should be noted that, the noise may further be used first herein to fill the spectral coefficient that has not been obtained by means of decoding and is in the sub-band with unsaturated bit allocation, and then the target gain is exerted on the filling noise in order to restore the spectral coefficient that has not been obtained by means of decoding. In addition, after noise filling is performed on the spectral coefficient that has not been obtained by means of decoding and is in the sub-band with unsaturated bit allocation (that is, the spectral coefficient that has not been obtained by means of decoding is restored), interframe smoothing processing may further be performed on a restored spectral coefficient to achieve a better decoding effect.

In foregoing steps of FIG. 2, an execution sequence of some steps may be adjusted according to a requirement. For example, it may be that step 220 is executed first and then step 210 is executed, or it may be that steps 210 and 220 are simultaneously executed.

In addition, an abnormal sub-band with a large peak-to-average ratio may exist in the sub-band with unsaturated bit allocation, and a target gain of the abnormal sub-band may further be corrected in order to obtain a target gain that is more suitable for the abnormal sub-band. Further, a peak-to-average ratio of a spectral coefficient of the sub-band whose average quantity of allocated bits per spectral coefficient is greater than or equal to the second threshold may be calculated, and the peak-to-average ratio is compared with a third threshold, and for a sub-band whose peak-to-average ratio is greater than the third threshold, after a target gain is obtained in step 230, a ratio (norm[sfm]/peak) of an envelope of the sub-band with unsaturated bit allocation to a maximum signal amplitude of the sub-band with unsaturated bit allocation may be used to correct the target gain of the sub-band whose peak-to-average ratio is greater than the third threshold. The third threshold may be preset according to a requirement.

A flow of a method for decoding a signal provided in an embodiment of the present disclosure includes obtaining spectral coefficients of sub-bands from a received bitstream by means of decoding, classifying sub-bands in which the spectral coefficients are located into a sub-band with saturated bit allocation and a sub-band with unsaturated bit allocation, performing noise filling on a spectral coefficient that has not been obtained by means of decoding and is in the sub-band with unsaturated bit allocation in order to restore the spectral coefficient that has not been obtained by means of decoding, and obtaining a frequency domain signal according to the spectral coefficients obtained by means of decoding and the restored spectral coefficient.

In another embodiment of the present disclosure, classifying sub-bands in which the spectral coefficients are located into a sub-band with saturated bit allocation and a sub-band with unsaturated bit allocation may include comparing an average quantity of allocated bits per spectral coefficient with a first threshold, where an average quantity of allocated bits per spectral coefficient of one sub-band is a ratio of a quantity of bits allocated for the one sub-band to a quantity of spectral coefficients in the one sub-band, and using a sub-band whose average quantity of allocated bits per spectral coefficient is greater than or equal to the first threshold as a sub-band with saturated bit allocation, and using a sub-band whose average quantity of allocated bits per spectral coefficient is less than the first threshold as a sub-band with unsaturated bit allocation.

In another embodiment of the present disclosure, performing noise filling on a spectral coefficient that has not been obtained by means of decoding and is in the sub-band with unsaturated bit allocation may include comparing the average quantity of allocated bits per spectral coefficient with 0, where an average quantity of allocated bits per spectral coefficient of one sub-band is a ratio of a quantity of bits allocated for the one sub-band to a quantity of spectral coefficients in the one sub-band, calculating a harmonic parameter of a sub-band whose average quantity of allocated bits per spectral coefficient is not equal to 0, where the harmonic parameter represents harmonic strength or weakness of a frequency domain signal, and performing, based on the harmonic parameter, noise filling on the spectral coefficient that has not been obtained by means of decoding and is in the sub-band with unsaturated bit allocation.

In another embodiment of the present disclosure, calculating a harmonic parameter of a sub-band whose average quantity of allocated bits per spectral coefficient is not equal to 0 may include calculating at least one parameter of a peak-to-average ratio, a peak envelope ratio, sparsity of a spectral coefficient obtained by means of decoding, a bit allocation variance of an entire frame, an average envelope ratio, an average-to-peak ratio, an envelope peak ratio, and an envelope average ratio that are of the sub-band whose average quantity of allocated bits per spectral coefficient is not equal to 0, and using one of the calculated at least one parameter or using, in a combining manner, the calculated parameter as the harmonic parameter.

In another embodiment of the present disclosure, performing, based on the harmonic parameter, noise filling on the spectral coefficient that has not been obtained by means of decoding and is in the sub-band with unsaturated bit allocation may include calculating, according to an envelope of the sub-band with unsaturated bit allocation and a spectral coefficient obtained by means of decoding, a noise filling gain of the sub-band with unsaturated bit allocation, calculating the peak-to-average ratio of the sub-band whose average quantity of allocated bits per spectral coefficient is not equal to 0 and obtaining a global noise factor based on the peak-to-average ratio, correcting the noise filling gain based on the harmonic parameter and the global noise factor so as to obtain a target gain, and using the target gain and a weighted value of noise to restore the spectral coefficient that has not been obtained by means of decoding and is in the sub-band with unsaturated bit allocation.

In another embodiment of the present disclosure, performing, based on the harmonic parameter, noise filling on the spectral coefficient that has not been obtained by means of decoding and is in the sub-band with unsaturated bit allocation may further include calculating a peak-to-average ratio of the sub-band with unsaturated bit allocation and comparing the peak-to-average ratio with a third threshold, and for a sub-band, whose peak-to-average ratio is greater than the third threshold, with unsaturated bit allocation, after a target gain is obtained, using a ratio of an envelope of the sub-band with unsaturated bit allocation to a maximum amplitude of a spectral coefficient, obtained by means of decoding, in the sub-band with unsaturated bit allocation to correct the target gain.

In another embodiment of the present disclosure, correcting the noise filling gain based on the harmonic parameter and the global noise factor so as to obtain a target gain may include comparing the harmonic parameter with a fourth threshold, obtaining the target gain using $gain_T$=fac*gain*norm/peak when the harmonic parameter is greater than or equal to the fourth threshold, and obtaining the target gain using $gain_T$=fac'*gain and fac'=fac+step when the harmonic parameter is less than the fourth threshold, where $gain_T$ is the target gain, fac is the global noise factor, norm is the envelope of the sub-band with unsaturated bit allocation, peak is a maximum amplitude of the spectral coefficient, obtained by means of decoding, in the sub-band with unsaturated bit allocation, and step is a step by which the global noise factor changes according to a frequency.

In another embodiment of the present disclosure, performing, based on the harmonic parameter, noise filling on the spectral coefficient that has not been obtained by means of decoding and is in the sub-band with unsaturated bit allocation may further include performing interframe smoothing processing on the restored spectral coefficient after the spectral coefficient that has not been obtained by means of decoding is restored.

Figure 3:
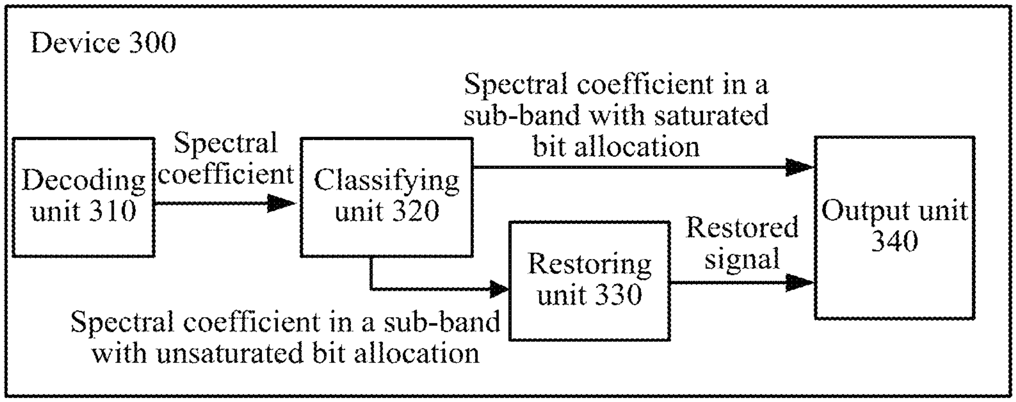
FIG. 3 is a block diagram of a device for decoding a signal according to an embodiment of the present disclosure.
Figure 4:
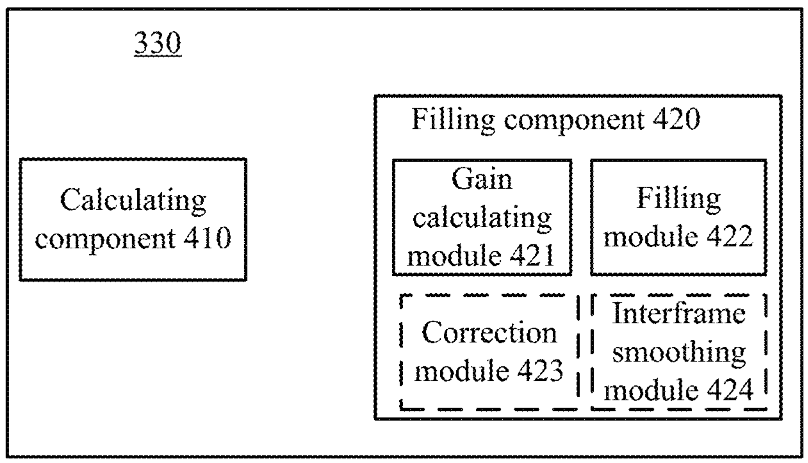
FIG. 4 is a block diagram of a restoring unit of a device for decoding a signal according to an embodiment of the present disclosure.

FIG. 3 is a block diagram of a device 300 for decoding a signal according to an embodiment of the present disclosure. FIG. 4 is a block diagram of a restoring unit 330 of a device for decoding a signal according to an embodiment of the present disclosure. The following describes the device for decoding a signal with reference to FIG. 3 and FIG. 4.

As shown in FIG. 3, the device 300 for decoding a signal includes a decoding unit 310 configured to obtain spectral coefficients of sub-bands from a received bitstream by means of decoding, where the decoding unit 330 may obtain the spectral coefficients from the received bitstream by means of decoding, and group the spectral coefficients into the sub-bands, a classifying unit 320 configured to classify sub-bands in which the spectral coefficients are located into a sub-band with saturated bit allocation and a sub-band with unsaturated bit allocation, where the sub-band with saturated bit allocation refers to a sub-band in which allocated bits can be used to encode all spectral coefficients in the sub-band, and the sub-band with unsaturated bit allocation refers to a sub-band in which allocated bits can be used to encode only a part of spectral coefficients in the sub-band, and a sub-band for which no bit is allocated, the restoring unit 330 configured to perform noise filling on a spectral coefficient that has not been obtained by means of decoding and is in the sub-band with unsaturated bit allocation in order to restore the spectral coefficient that has not been obtained by means of decoding, and an output unit 340 configured to obtain a frequency domain signal according to the spectral coefficients obtained by means of decoding and the restored spectral coefficient.

The decoding unit 310 may receive a bitstream of various classes of signals and use various decoding methods to perform decoding so as to obtain the spectral coefficients obtained by means of decoding. A signal class and a decoding method do not constitute a limitation on the present disclosure. In an example of grouping sub-bands, the decoding unit 310 may evenly group a frequency band in which the spectral coefficients are located into multiple sub-bands, and then the spectral coefficients are grouped, according to a frequency of each spectral coefficient, into the sub-bands in which the frequencies are located.

The classifying unit 320 may classify sub-bands in which the spectral coefficients are located into a sub-band with saturated bit allocation and a sub-band with unsaturated bit allocation. In an example, the classifying unit 320 may perform classification according to an average quantity of allocated bits per spectral coefficient in a sub-band. Further, the classifying unit 320 may include a comparing component configured to compare an average quantity of allocated bits per spectral coefficient with a first threshold, where the average quantity of allocated bits per spectral coefficient is a ratio of a quantity of bits allocated for each sub-band to a quantity of spectral coefficients in each sub-band, that is, an average quantity of allocated bits per spectral coefficient of one sub-band is a ratio of a quantity of bits allocated for the one sub-band to a quantity of spectral coefficients in the one sub-band, and a classifying component configured to classify a sub-band whose average quantity of allocated bits per spectral coefficient is greater than or equal to the first threshold as a sub-band with saturated bit allocation, and classify a sub-band whose average quantity of allocated bits per spectral coefficient is less than the first threshold as a sub-band with unsaturated bit allocation. As previously described, the average quantity of allocated bits per spectral coefficient in a sub-band may be obtained by grouping a quantity of bits allocated for the sub-band by a quantity of spectral coefficients in the sub-band. The first threshold may be preset, or may be easily obtained by an experiment.

The restoring unit 330 may perform noise filling on the spectral coefficient that has not been obtained by means of decoding and is in the sub-band with unsaturated bit allocation in order to restore the spectral coefficient that has not been obtained by means of decoding. The sub-band with unsaturated bit allocation may include a sub-band for which no bit is allocated and a sub-band for which bits is allocated but bit allocation is unsaturated. Various noise filling methods may be used to restore the spectral coefficient that has not been obtained by means of decoding. In this embodiment of the present disclosure, the restoring unit 330 may perform noise filling based on a harmonic parameter harm of a sub-band whose quantity of bits is greater than or equal to a second threshold. Further, as shown in FIG. 4, the restoring unit 330 may include a calculating component 410 configured to compare the average quantity of allocated bits per spectral coefficient with the second threshold, and calculate the harmonic parameter of the sub-band whose average quantity of allocated bits per spectral coefficient is greater than or equal to the second threshold, where the average quantity of allocated bits per spectral coefficient is the ratio of the quantity of bits allocated for each sub-band to the quantity of spectral coefficients in each sub-band, that is, an average quantity of allocated bits per spectral coefficient of one sub-band is a ratio of a quantity of bits allocated for the one sub-band to a quantity of spectral coefficients in the one sub-band, and the harmonic parameter represents harmonic strength or weakness of a frequency domain signal, and a filling component 420 configured to perform, based on the harmonic parameter, noise filling on the spectral coefficient that has not been obtained by means of decoding and is in the sub-band with unsaturated bit allocation in order to restore the spectral coefficient that has not been obtained by means of decoding. As previously described, the second threshold is less than or equal to the first threshold, therefore, the first threshold may be used as the second threshold. Another threshold less than the first threshold may also be set as the second threshold. A harmonic parameter harm of a frequency domain signal is used to represent harmonic strength or weakness of the frequency domain signal. In a case in which harmonicity is strong, there are a relatively large quantity of spectral coefficients with a value of 0 in the spectral coefficients obtained by means of decoding, and noise filling does not need to be performed on these spectral coefficients with the value of 0. Therefore, if noise filling is differentially performed, based on the harmonic parameter of the frequency domain signal, on the spectral coefficient (that is, a spectral coefficient with the value of 0) that has not been obtained by means of decoding, an error of noise filling performed on the spectral coefficients, obtained by means of decoding, with the value of 0 may be avoided, thereby improving signal decoding quality.

As previously described, the calculating component 410 may calculate the harmonic parameter using the following operations of calculating at least one parameter of a peak-to-average ratio, a peak envelope ratio, sparsity of a spectral coefficient obtained by means of decoding, a bit allocation variance of an entire frame, an average envelope ratio, an average-to-peak ratio, an envelope peak ratio, and an envelope average ratio that are of the sub-band whose average quantity of allocated bits per spectral coefficient is greater than or equal to the second threshold, and using one of the calculated at least one parameter or using, in a combining manner, the calculated parameter as the harmonic parameter. For a specific method for calculating the harmonic parameter, reference may be made to the foregoing descriptions that are made with reference to formula (1) to formula (4), and details are not described herein again.

As previously described, after the calculating component 410 obtains the harmonic parameter, the filling component 420 performs, based on the harmonic parameter, noise filling on the spectral coefficient that has not been obtained by means of decoding and is in the sub-band with unsaturated bit allocation, which is described below in detail.

The output unit 340 may obtain the frequency domain signal according to the spectral coefficients obtained by means of decoding and the restored spectral coefficient. After the spectral coefficients obtained by means of decoding are obtained by means of decoding and the restoring unit 330 restores the spectral coefficient that has not been obtained by means of decoding, spectral coefficients in an entire frequency band are obtained, and an output signal of a time domain is obtained by performing processing such as transformation, for example, IFFT. In practice, an engineering person skilled in the art understands a solution to how an output signal of a time domain is obtained according to a frequency domain signal, and details are not described herein again.

In the foregoing device for decoding a signal in this embodiment of the present disclosure, a classifying unit 320 obtains a sub-band with unsaturated bit allocation from sub-bands of a frequency domain signal by means of classification, and a restoring unit 330 restores a spectral coefficient that has not been obtained by means of decoding and is in the sub-band with unsaturated bit allocation, thereby improving signal decoding quality. In addition, in a case in which the spectral coefficient that has not been obtained by means of decoding is restored based on a harmonic parameter obtained by a calculating component 410 by means of calculation, an error of noise filling performed on spectral coefficients, obtained by means of decoding, with a value of 0 may be avoided, thereby further enhancing signal decoding quality.

The following further describes operations performed by the filling component 420 in FIG. 4. The filling component 420 may include a gain calculating module 421 configured to calculate, according to an envelope of the sub-band with unsaturated bit allocation and a spectral coefficient obtained by means of decoding, a noise filling gain of the sub-band with unsaturated bit allocation, calculate the peak-to-average ratio of the sub-band whose average quantity of allocated bits per spectral coefficient is greater than or equal to the second threshold and obtain a global noise factor based on the peak-to-average ratio, and correct the noise filling gain based on the harmonic parameter and the global noise factor so as to obtain a target gain, and a filling module 422 configured to use the target gain and a weighted value of noise to restore the spectral coefficient that has not been obtained by means of decoding and is in the sub-band with unsaturated bit allocation. In another embodiment, the filling component 420 further includes an interframe smoothing module 424 configured to perform interframe smoothing processing on the restored spectral coefficient to obtain a spectral coefficient on which smoothing processing has been performed after noise filling is performed on the spectral coefficient that has not been obtained by means of decoding and is in the sub-band with unsaturated bit allocation. The output unit 340 is configured to obtain the frequency domain signal according to the spectral coefficients obtained by means of decoding and the spectral coefficient on which smoothing processing has been performed. A better decoding effect may be achieved using interframe smoothing processing.

The gain calculating module 421 may use either the foregoing formula (5) or (6) to calculate the noise filling gain of the sub-band with unsaturated bit allocation, use a multiple of a reciprocal of an average value of a peak-to-average ratio sharp (referring to descriptions with reference to formula (1) in the foregoing) of the sub-band with saturated bit allocation as a global noise factor fac, and correct the noise filling gain based on the harmonic parameter and the global noise factor so as to obtain a target gain $gain_T$. In an example of obtaining the target gain $gain_T$, the gain calculating module 421 may perform the following operations of comparing the harmonic parameter with a fourth threshold, obtaining the target gain using the foregoing formula (8) when the harmonic parameter is greater than or equal to the fourth threshold, and obtaining the target gain using the foregoing formula (9) when the harmonic parameter is less than the fourth threshold. In addition, the gain calculating module 421 may also directly use the foregoing formula (7) to obtain the target gain.

In another embodiment, the filling component 420 further includes a correction module 423 configured to calculate a peak-to-average ratio of the sub-band with unsaturated bit allocation and compare the peak-to-average ratio with a third threshold, and for a sub-band, whose peak-to-average ratio is greater than the third threshold, with unsaturated bit allocation, after a target gain is obtained, use a ratio of an envelope of the sub-band with unsaturated bit allocation to a maximum amplitude of a spectral coefficient, obtained by means of decoding, in the sub-band with unsaturated bit allocation to correct the target gain in order to obtain a corrected target gain. The filling module uses the corrected target gain to restore the spectral coefficient that has not been obtained by means of decoding and is in the sub-band with unsaturated bit allocation. A purpose is to correct an abnormal sub-band with a large peak-to-average ratio in the sub-band with unsaturated bit allocation in order to obtain a more appropriate target gain.

In addition to performing noise filling in the foregoing manner, the filling module 422 may further first use noise to fill the spectral coefficient that has not been obtained by means of decoding and is in the sub-band with unsaturated bit allocation, and then exert the target gain on the filled noise in order to restore the spectral coefficient that has not been obtained by means of decoding.

It should be noted that structural classification in FIG. 4 is merely exemplary, and may be flexibly implemented in another classification manner in practice, for example, the calculating component 410 may be used to implement the operations of the gain calculating module 421.

Figure 5:
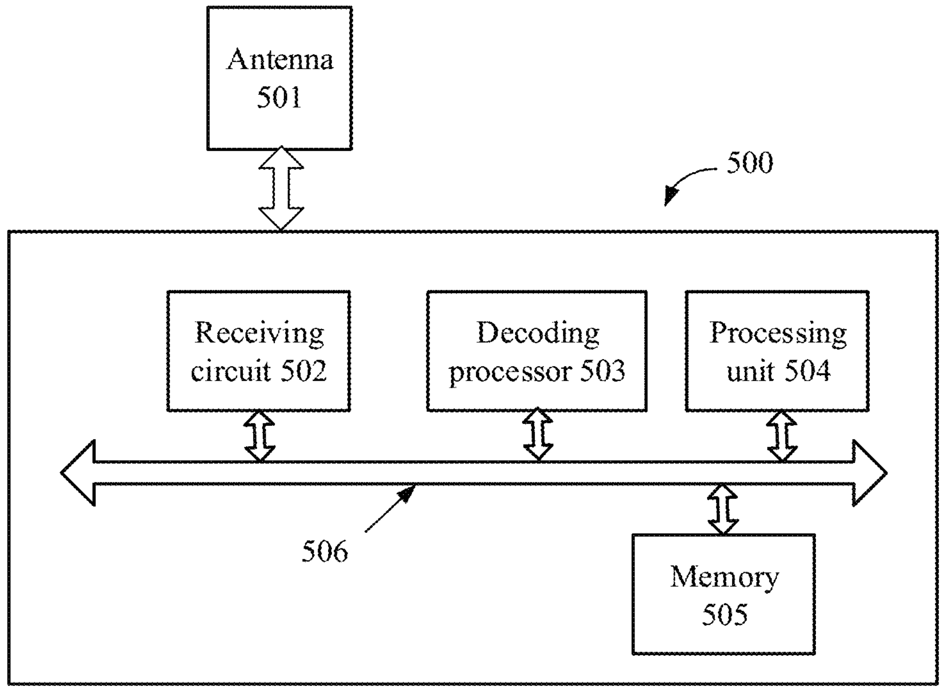
FIG. 5 is a block diagram of an apparatus according to another embodiment of the present disclosure.

FIG. 5 is a block diagram of an apparatus 500 according to another embodiment of the present disclosure. The apparatus 500 in FIG. 5 may be configured to implement steps and methods in the foregoing method embodiments. The apparatus 500 may be applied to a base station or a terminal in various communication systems. In the embodiment of FIG. 5, the apparatus 500 includes a receiving circuit 502, a decoding processor 503, a processing unit 504, a memory 505, and an antenna 501. The processing unit 504 controls an operation of the apparatus 500, and the processing unit 504 may also be referred to as a central processing unit (CPU). The memory 505 may include a read-only memory (ROM) and a random access memory (RAM), and provide an instruction and data to the processing unit 504. A part of the memory 505 may further include a nonvolatile RAM (NVRAM). In a specific application, the apparatus 500 may be built in or may be a wireless communications device such as a mobile phone, and the apparatus 500 may further include a carrier that accommodates the receiving circuit 502 in order to allow the apparatus 500 to receive data from a remote location. The receiving circuit 502 may be coupled to the antenna 501. Components of the apparatus 500 are coupled together using a bus system 506, where the bus system 506 further includes a power bus, a control bus, and a state signal bus in addition to a data bus. However, for clarity of description, various buses are marked as the bus system "506" in FIG. 5. The apparatus 500 may further include the processing unit 504 configured to process a signal, and in addition, further includes the decoding processor 503.

The methods disclosed in the foregoing embodiments of the present disclosure may be applied to the decoding processor 503, or implemented by the decoding processor 503. The decoding processor 503 may be an integrated circuit chip, which has a signal processing capability. In an implementation process, the steps in the foregoing methods may be implemented using an integrated logic circuit of hardware in the decoding processor 503 or instructions in a form of software. These instructions may be implemented and controlled by working with the processing unit 504. The foregoing decoding processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The foregoing decoding processor may implement or execute methods, steps, and logical block diagrams disclosed in the embodiments of the present disclosure. The general purpose processor may be a microprocessor, or the processor may also be any conventional processor, translator, or the like. Steps of the methods disclosed with reference to the embodiments of the present disclosure may be directly executed and accomplished by a decoding processor embodied as hardware, or may be executed and accomplished using a combination of hardware and software modules in the decoding processor. The software module may be located in a mature storage medium in the art, such as a RAM, a flash memory, a ROM, a programmable ROM (PROM), an electrically-erasable PROM (EEPROM), or a register. The storage medium is located in the memory 505. The decoding processor 503 reads information from the memory 505, and completes the steps of the foregoing methods in combination with the hardware.

For example, the device 300 for decoding a signal in FIG. 3 may be implemented by the decoding processor 503. In addition, the classifying unit 320, the restoring unit 330, and the output unit 340 in FIG. 3 may be implemented by the processing unit 504, or may be implemented by the decoding processor 503. However, the foregoing examples are merely exemplary, and are not intended to limit the embodiments of the present disclosure to this specific implementation manner.

Further, the memory 505 stores an instruction that enables the processing unit 504 or the decoding processor 503 to implement the following operations of obtaining spectral coefficients of sub-bands from a received bitstream by means of decoding, classifying sub-bands in which the spectral coefficients are located into a sub-band with saturated bit allocation and a sub-band with unsaturated bit allocation, where the sub-band with saturated bit allocation refers to a sub-band in which allocated bits can be used to encode all spectral coefficients in the sub-band, and the sub-band with unsaturated bit allocation refers to a sub-band in which allocated bits can be used to encode only a part of spectral coefficients in the sub-band, and a sub-band for which no bit is allocated, performing noise filling on a spectral coefficient that has not been obtained by means of decoding and is in the sub-band with unsaturated bit allocation in order to restore the spectral coefficient that has not been obtained by means of decoding, and obtaining a frequency domain signal according to the spectral coefficients obtained by means of decoding and the restored spectral coefficient.

In the foregoing apparatus 500 in this embodiment of the present disclosure, a sub-band with unsaturated bit allocation is obtained by classification from sub-bands in a frequency domain signal, and a spectral coefficient that has not been obtained by means of decoding and is in the sub-band with unsaturated bit allocation is restored, thereby improving signal decoding quality.

A device for decoding a signal provided in an embodiment of the present disclosure may include a decoding unit configured to obtain spectral coefficients of sub-bands from a received bitstream by means of decoding, a classifying unit configured to classify sub-bands in which the spectral coefficients are located into a sub-band with saturated bit allocation and a sub-band with unsaturated bit allocation, a restoring unit configured to perform noise filling on a spectral coefficient that has not been obtained by means of decoding and is in the sub-band with unsaturated bit allocation in order to restore the spectral coefficient that has not been obtained by means of decoding, and an output unit configured to obtain a frequency domain signal according to the spectral coefficients obtained by means of decoding and the restored spectral coefficient.

In an embodiment of the present disclosure, the classifying unit may include a comparing component configured to compare an average quantity of allocated bits per spectral coefficient with a first threshold, where an average quantity of allocated bits per spectral coefficient of one sub-band is a ratio of a quantity of bits allocated for the one sub-band to a quantity of spectral coefficients in the one sub-band, and a classifying component configured to classify a sub-band whose average quantity of allocated bits per spectral coefficient is greater than or equal to the first threshold as a sub-band with saturated bit allocation, and classify a sub-band whose average quantity of allocated bits per spectral coefficient is less than the first threshold as a sub-band with unsaturated bit allocation.

In an embodiment of the present disclosure, the restoring unit may include a calculating component configured to compare the average quantity of allocated bits per spectral coefficient with 0, and calculate a harmonic parameter of a sub-band whose average quantity of allocated bits per spectral coefficient is not equal to 0, where an average quantity of allocated bits per spectral coefficient of one sub-band is a ratio of a quantity of bits allocated for the one sub-band to a quantity of spectral coefficients in the one sub-band, and the harmonic parameter represents harmonic strength or weakness of a frequency domain signal, and a filling component configured to perform, based on the harmonic parameter, noise filling on the spectral coefficient that has not been obtained by means of decoding and is in the sub-band with unsaturated bit allocation in order to restore the spectral coefficient that has not been obtained by means of decoding.

In an embodiment of the present disclosure, the calculating component may calculate the harmonic parameter using the following operations of calculating at least one parameter of a peak-to-average ratio, a peak envelope ratio, sparsity of a spectral coefficient obtained by means of decoding, a bit allocation variance of an entire frame, an average envelope ratio, an average-to-peak ratio, an envelope peak ratio, and an envelope average ratio that are of the sub-band whose average quantity of allocated bits per spectral coefficient is not equal to 0, and using one of the calculated at least one parameter or using, in a combining manner, the calculated parameter as the harmonic parameter.

In an embodiment of the present disclosure, the filling component may include a gain calculating module configured to calculate, according to an envelope of the sub-band with unsaturated bit allocation and a spectral coefficient obtained by means of decoding, a noise filling gain of the sub-band with unsaturated bit allocation, calculate the peak-to-average ratio of the sub-band whose average quantity of allocated bits per spectral coefficient is not equal to 0 and obtain a global noise factor based on the peak-to-average ratio, and correct the noise filling gain based on the harmonic parameter and the global noise factor so as to obtain a target gain, and a filling module configured to use the target gain and a weighted value of noise to restore the spectral coefficient that has not been obtained by means of decoding and is in the sub-band with unsaturated bit allocation.

In an embodiment of the present disclosure, the filling component may further include a correction module configured to calculate a peak-to-average ratio of the sub-band with unsaturated bit allocation and comparing the peak-to-average ratio with a third threshold, and for a sub-band, whose peak-to-average ratio is greater than the third threshold, with unsaturated bit allocation, after a target gain is obtained, use a ratio of an envelope of the sub-band with unsaturated bit allocation to a maximum amplitude of a spectral coefficient, obtained by means of decoding, in the sub-band with unsaturated bit allocation to correct the target gain in order to obtain a corrected target gain, where the filling module uses the corrected target gain and the weighted value of noise to restore the spectral coefficient that has not been obtained by means of decoding and is in the sub-band with unsaturated bit allocation.

In an embodiment of the present disclosure, the gain calculating module may correct, using the following operations, the noise filling gain based on the harmonic parameter and the global noise factor, comparing the harmonic parameter with a fourth threshold, obtaining the target gain using $gain_T$=fac*gain*norm/peak when the harmonic parameter is greater than or equal to the fourth threshold, and obtaining the target gain using $gain_T$=fac'*gain and fac'=fac+step when the harmonic parameter is less than the fourth threshold, where $gain_T$ is the target gain, fac is the global noise factor, norm is the envelope of the sub-band with unsaturated bit allocation, peak is a maximum amplitude of the spectral coefficient, obtained by means of decoding, in the sub-band with unsaturated bit allocation, and step is a step by which the global noise factor changes according to a frequency.

In an embodiment of the present disclosure, the filling component may further include an interframe smoothing module configured to perform interframe smoothing processing on the restored spectral coefficient to obtain a spectral coefficient on which smoothing processing has been performed after the spectral coefficient that has not been obtained by means of decoding is restored, where the output unit is configured to obtain the frequency domain signal according to the spectral coefficients obtained by means of decoding and the spectral coefficient on which smoothing processing has been performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing device, unit, part, and module, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method comprising:

obtaining spectral coefficients of sub-bands from a received bitstream by means of decoding;

classifying sub-bands in which the spectral coefficients are located into a sub-band with saturated bit allocation and a sub-band with unsaturated bit allocation, including:

comparing an average quantity of allocated bits per spectral coefficient with a first threshold, wherein an average quantity of allocated bits per spectral coefficient of one sub-band is a ratio of a quantity of bits allocated for the one sub-band to a quantity of spectral coefficients in the one sub-band, wherein a sub-band whose average quantity of allocated bits per spectral coefficient is greater than or equal to the first threshold is classified as the sub-band with saturated bit allocation, and a sub-band whose average quantity of allocated bits per spectral coefficient is less than the first threshold is classified as the sub-band with unsaturated bit allocation;

performing noise filling on a spectral coefficient that has not been obtained by means of decoding and is in the sub-band with unsaturated bit allocation, to reconstruct the spectral coefficient that has not been obtained by means of decoding, including:

comparing an average quantity of allocated bits per spectral coefficient with a second threshold, wherein the second threshold is less than the first threshold;

calculating a harmonic parameter of a sub-band whose average quantity of allocated bits per spectral coefficient is greater than or equal to the second threshold, wherein the harmonic parameter represents harmonic strength or weakness of a frequency domain signal; and performing, based on the harmonic parameter, noise filling on the spectral coefficient that has not been obtained by means of decoding and is in the sub-band with unsaturated bit allocation; and obtaining a frequency domain signal according to the spectral coefficients obtained by means of decoding and the reconstructed spectral coefficient.

2. An apparatus comprising:

a memory storing computer executable instructions; and a processor configured to execute the computer executable instructions to:

obtain spectral coefficients of sub-bands from a received bitstream by means of decoding;

classify, based on an average quantity of allocated bits per spectral coefficient, sub-bands in which the spectral coefficients are located into a sub-band with saturated bit allocation and a sub-band with unsaturated bit allocation, including:

compare an average quantity of allocated bits per spectral coefficient with a first threshold, wherein an average quantity of allocated bits per spectral coefficient of one sub-band is a ratio of a quantity of bits allocated for the one sub-band to a quantity of spectral coefficients in the one sub-band, wherein a sub-band whose average quantity of allocated bits per spectral coefficient is greater than or equal to the first threshold is classified as the sub-band with saturated bit allocation, and a sub-band whose average quantity of allocated bits per spectral coefficient is less than the first threshold is classified as the sub-band with unsaturated bit allocation;

perform noise filling on a spectral coefficient that has not been obtained by means of decoding and is in the sub-band with unsaturated bit allocation to reconstruct the spectral coefficient that has not been obtained by means of decoding, including:

compare an average quantity of allocated bits per spectral coefficient with a second threshold, wherein the second threshold is less than the first threshold;

calculate a harmonic parameter of a sub-band whose average quantity of allocated bits per spectral coefficient is greater than or equal to the second threshold, wherein the harmonic parameter represents harmonic strength or weakness of a frequency domain signal; and perform, based on the harmonic parameter, noise filling on the spectral coefficient that has not been obtained by means of decoding and is in the sub-band with unsaturated bit allocation; and obtain a frequency domain signal according to the spectral coefficients obtained by means of decoding and the reconstructed spectral coefficient.

3. A non-transitory computer-readable storage medium having stored thereon computer executable instructions that, when executed by a processor of a computing apparatus, cause the computing apparatus to perform operations of:

obtaining spectral coefficients of sub-bands from a received bitstream by means of decoding;

classifying sub-bands in which the spectral coefficients are located into a sub-band with saturated bit allocation and a sub-band with unsaturated bit allocation, including:

comparing an average quantity of allocated bits per spectral coefficient with a first threshold, wherein an average quantity of allocated bits per spectral coefficient of one sub-band is a ratio of a quantity of bits allocated for the one sub-band to a quantity of spectral coefficients in the one sub-band, wherein a sub-band whose average quantity of allocated bits per spectral coefficient is greater than or equal to the first threshold is classified as the sub-band with saturated bit allocation, and a sub-band whose average quantity of allocated bits per spectral coefficient is less than the first threshold is classified as the sub-band with unsaturated bit allocation;

performing noise filling on a spectral coefficient that has not been obtained by means of decoding and is in the sub-band with unsaturated bit allocation, to reconstruct the spectral coefficient that has not been obtained by means of decoding, including:

comparing an average quantity of allocated bits per spectral coefficient with a second threshold, wherein the second threshold is less than the first threshold;

calculating a harmonic parameter of a sub-band whose average quantity of allocated bits per spectral coefficient is greater than or equal to the second threshold, wherein the harmonic parameter represents harmonic strength or weakness of a frequency domain signal; and performing, based on the harmonic parameter, noise filling on the spectral coefficient that has not been obtained by means of decoding and is in the sub-band with unsaturated bit allocation; and obtaining a frequency domain signal according to the spectral coefficients obtained by means of decoding and the reconstructed spectral coefficient.

* * * * *